United States Patent [19]
Wada

[11] Patent Number: 5,163,704
[45] Date of Patent: Nov. 17, 1992

[54] CONTROL APPARATUS OF SUPPORT UNIT
[75] Inventor: Shunichi Wada, Himeji, Japan
[73] Assignee: Mitsubishi Denki K.K., Tokyo, Japan
[21] Appl. No.: 825,770
[22] Filed: Jan. 21, 1992

Related U.S. Application Data
[63] Continuation of Ser. No. 530,534, May 29, 1990, abandoned.

[30] Foreign Application Priority Data
May 29, 1989 [JP] Japan .................. 1-135219
May 29, 1989 [JP] Japan .................. 1-135220

[51] Int. Cl.⁵ .......................................... B60G 17/015
[52] U.S. Cl. ................. 280/707; 364/424.05
[58] Field of Search .............. 280/707, 772, 689, 6.12, 280/112.2; 364/424.05

[56] References Cited
U.S. PATENT DOCUMENTS

| | | | |
|---|---|---|---|
| 4,639,014 | 1/1987 | Tanaka et al. | 280/707 |
| 4,674,767 | 6/1987 | Kuroki et al. | 280/707 |
| 4,728,120 | 3/1988 | Buma et al. | 280/707 |
| 4,756,549 | 7/1988 | Kurosawa | 280/DIG. 1 |
| 4,984,820 | 1/1991 | Uchiyama | 280/707 |
| 5,072,392 | 12/1991 | Taniguchi | 280/707 |

FOREIGN PATENT DOCUMENTS

| | | |
|---|---|---|
| 0246772 | 11/1987 | European Pat. Off. . |
| 3632919 | 3/1986 | Fed. Rep. of Germany . |
| 61-150809 | 7/1986 | Japan .................. 280/707 |
| 62-88604 | 4/1987 | Japan |
| 62-199508 | 9/1987 | Japan .................. 280/707 |
| 63-8010 | 1/1988 | Japan . |
| 154414 | 6/1988 | Japan .................. 280/707 |
| 2186947 | 8/1987 | United Kingdom ........ 280/707 |

OTHER PUBLICATIONS
"Semi-Active Damping" by M. Lizell pp. 83-91 IMechE 1988.

Primary Examiner—Karin L. Tyson
Attorney, Agent, or Firm—Sughrue, Mion, Zinn, Macpeak & Seas

[57] ABSTRACT

A control apparatus which detects vertical and/or lateral acceleration of a vehicle body so as to control characteristic of a support unit for supporting the vehicle body, in other words, a damping force and/or a spring constant of a suspension, or torsion quantity of a stabilizer, on the basis of quantity of acceleration or a differentiated value thereof and vibration cycle period of the acceleration.

8 Claims, 5 Drawing Sheets

CONTROL APPARATUS OF SUPPORT UNIT

This is a continuation of application Ser. No. 530,534 filed May 29, 1990, now abandoned.

BACKGROUND OF THE INVENTION

1. Field of the Invention

The present invention relates to a control apparatus or controlling a characteristic of a support unit, in other words, a suspension and/or a stabilizer, for supporting a vehicle body in order to restrain vibrations thereof.

2. Description of Related Art

To improve comfort while riding in a vehicle, a characteristic of support unit, of the vehicle body should be SOFT. Concretely, it is better that a damping force of the suspension is reduced, a spring constant of the same is small and soft, and torsion quantity of the stabilizer is reduced. On the other hand, to improve steering stability, the characteristic of the support unit of vehicle body should be HARD. Concretely, it is better that a damping force of the suspension is large, the spring constant thereof is large and hard, and torsion quantity of the stabilizer is larger.

A change-over system has been developed which has set the characteristic of the support unit SOFT (or MEDIUM between HARD and SOFT) in the normal running condition and changes over the characteristic to be HARD by driving change-over means for changing-over the characteristic of the support unit corresponding to necessity, such as variation, in the road surface condition or the posture of vehicle body. Such a system is disclosed in, for example, the Japanese Patent Application Laid-Open No. 60-47709, which measures the duration of acceleration not less than a predetermined value of vibration of the body, so that only when the duration is not less than a predetermined time, the damping force of the suspension is raised or the spring constant thereof is increased.

In such an example, poor comfort to ride caused by vertical vibrations of the vehicle body in the vicinity of the above-spring resonance frequency is detected on the basis of the duration of acceleration not less than the predetermined value, thereby controlling the characteristic of suspension to be harder. In this case, unless at least a half cycle period of time of the decision frequency in the vicinity of the above-spring resonance frequency passes, it is impossible to decide whether or not the characteristic of suspension is properly controlled, thereby delaying the control. Also, an initially large body shock caused when the vehicle runs over a large mound, or a large variation in the posture of vehicle body, is difficult to properly control.

Also, it is judged whether the vehicle is running on a bad road and the characteristic of the suspension or the stabilizer is changed to MEDIUM on the basis of the frequency component of below-spring vibration of the vehicle body or a vertical or lateral vibration pattern, thereby executing control to keep good comfort to ride and contact with a bad road. In this case, control cannot be executed even on the bad road until a reliable decision for the vibration frequency or the vibration pattern ends.

As mentioned above, at an initial stage of vibration of the vehicle body, it is not clear whether the characteristic of suspension or stabilizer is to be HARD or MEDIUM, and it takes much time to determine an optimum control parameter only from the information of vibration frequency. Also, in the following stage, when the vibration waveform represents a pattern of complicatedly superposing the above-spring vibration on the below-spring vibration, the following decision is imperfect and there is a possibility that the decision further delays, as disclosed in the Japanese Patent Application Laid-Open No.63-8010.

SUMMARY OF THE INVENTION

An object of the present invention is to provide a control apparatus of a support unit, which is capable of reliably restraining a shock on the vehicle body or useless vibrations thereof even when the vehicle runs over a large mound.

Another object of the present invention is to provide a control apparatus of a support unit, which is capable of restraining in the smallest time poor ride comfort caused by a false decision.

The control apparatus of a support unit of the present invention detects the acceleration of a vehicle body and changes over the characteristic of the support unit on the basis of quantity and a vibration cycle period of the detected acceleration, or on the basis of a differentiated value and a vibration cycle period of the detected acceleration. When a quantity of the detected acceleration or the differentiated value thereof is not less than a predetermined value, the characteristic of the support unit is set to a certain step or state so that it is decided whether the characteristic of the support unit is maintained in this step or in another step corresponding to a length of the vibration cycle period.

Herein, the characteristic of the support unit is a damping force or a spring constant of a suspension, or torsion quantity of a stabilizer. Also, the detected acceleration of the vehicle body is that vertical and/or lateral thereof.

The above and further objects and features of the invention will more fully be apparent from the following detailed description taken with the accompanying drawings.

DESCRIPTION OF THE PREFERRED EMBODIMENTS

First Embodiment

Figure 1:
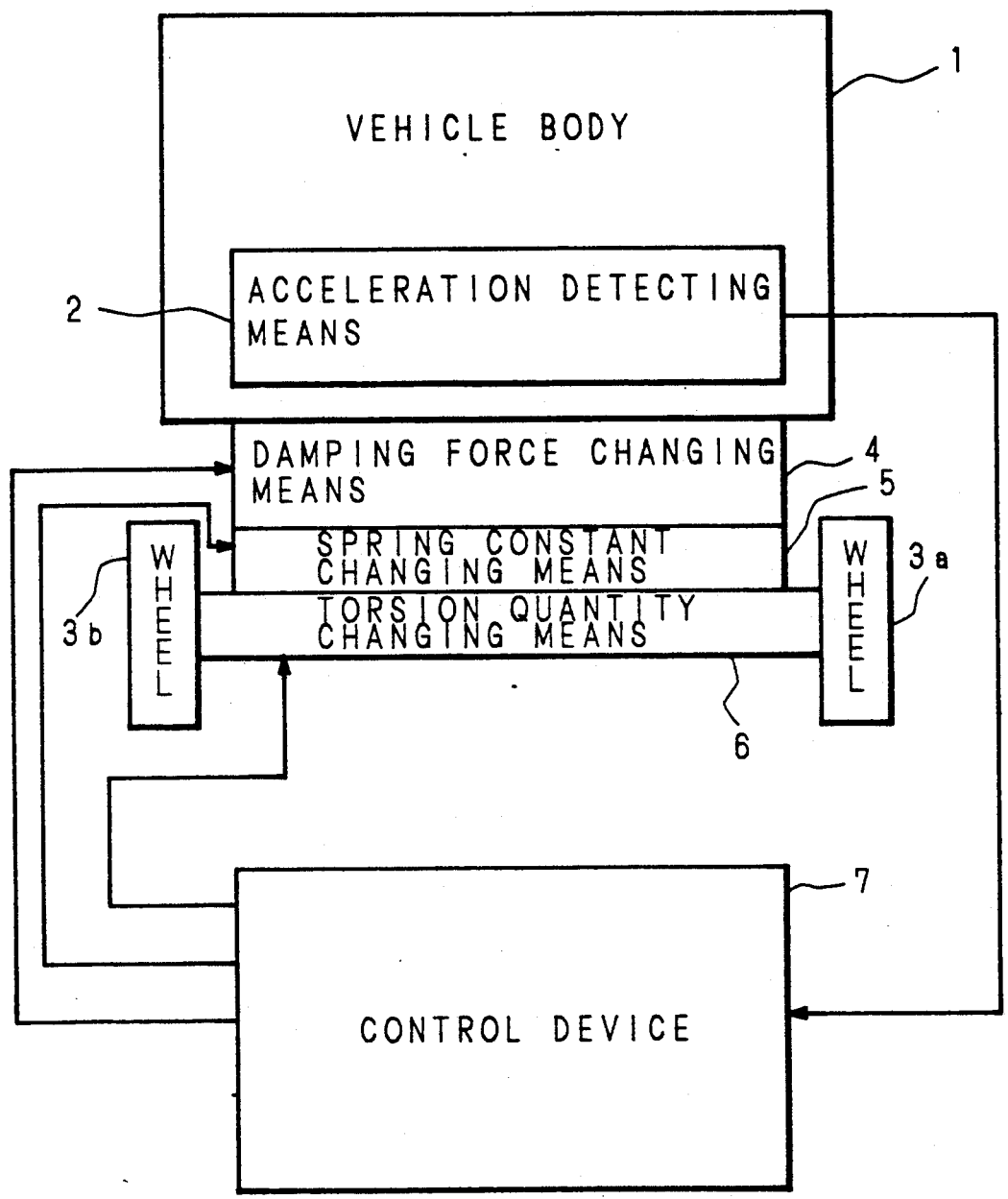
FIG. 1 is a block diagram showing a basic construction of a control apparatus of the present invention.

FIG. 1 is a block diagram of a control apparatus of the present invention, in which a vehicle body 1 is provided with acceleration detecting means 2 for detecting the vertical and/or lateral acceleration of the vehicle body 1, so that a detection signal obtained by the acceleration detecting means 2 is output to a control device 7. Between each wheel 3a, 3b and the vehicle body 1 is disposed a suspension as a support unit. Between wheels 3a and 3b is disposed a stabilizer as a support unit. A damping force of the suspension is changed-over into three steps or states of HARD, MEDIUM and SOFT by a damping force changing means 4 as change-over means. A spring constant of the suspension is changed-over into three steps of HARD, MEDIUM and SOFT by a spring constant changing means 5 as change-over means. Furthermore, torsion quantity of the stabilizer is changed-over into three steps or states of HARD, MEDIUM and SOFT by a torsion quantity changing means 6 as change-over means. The damping force changing means 4, spring constant changing means 5 and torsion quantity changing means 6 all change over a characteristic of the support unit corresponding thereto on the basis of a command signal from the control device 7. The control device 7 decides a quantity of acceleration and vibration cycle period of acceleration on the basis of detection signal from the acceleration detecting means 2, thereby outputting to each change-over means the command signal for changing over the characteristic. The damping force changing means 4 and the spring constant changing means 5 use ones disclosed in Japanese Patent Application Laid-Open No.60-47709 or No.240511. The torsion quantity changing means 6 uses one disclosed in Japanese Patent Application Laid-Open No.63-25119 or No.63-28709.

Figure 2:
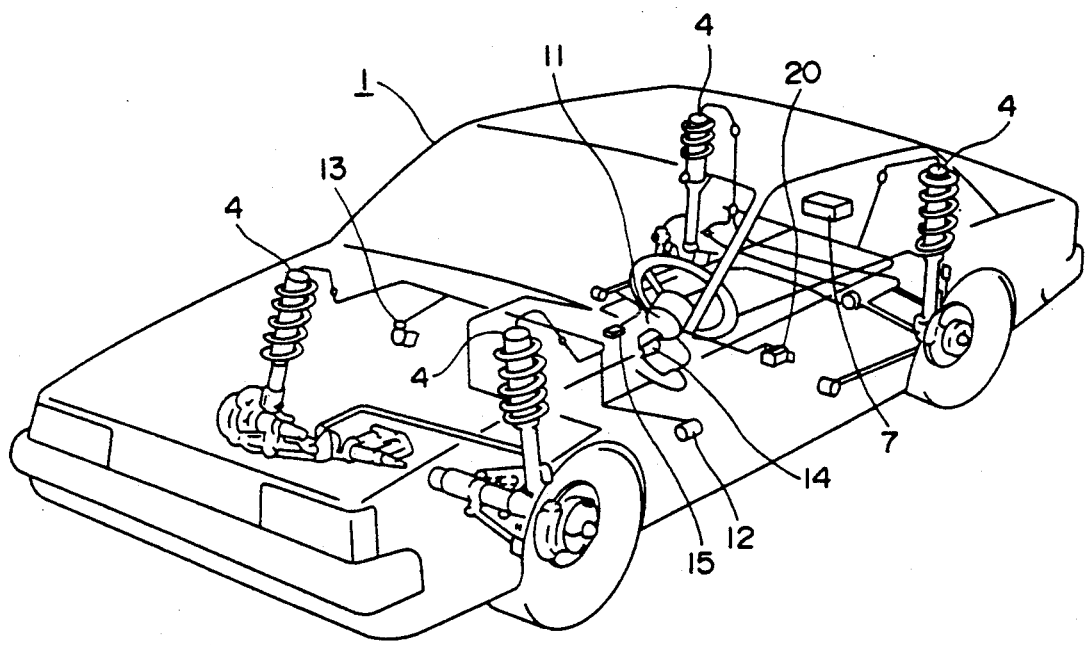
FIG. 2 is a perspective view showing a condition where each member is mounted in a vehicle, when the present invention is applied to change-over of a damping force of a suspension.
Figure 3:
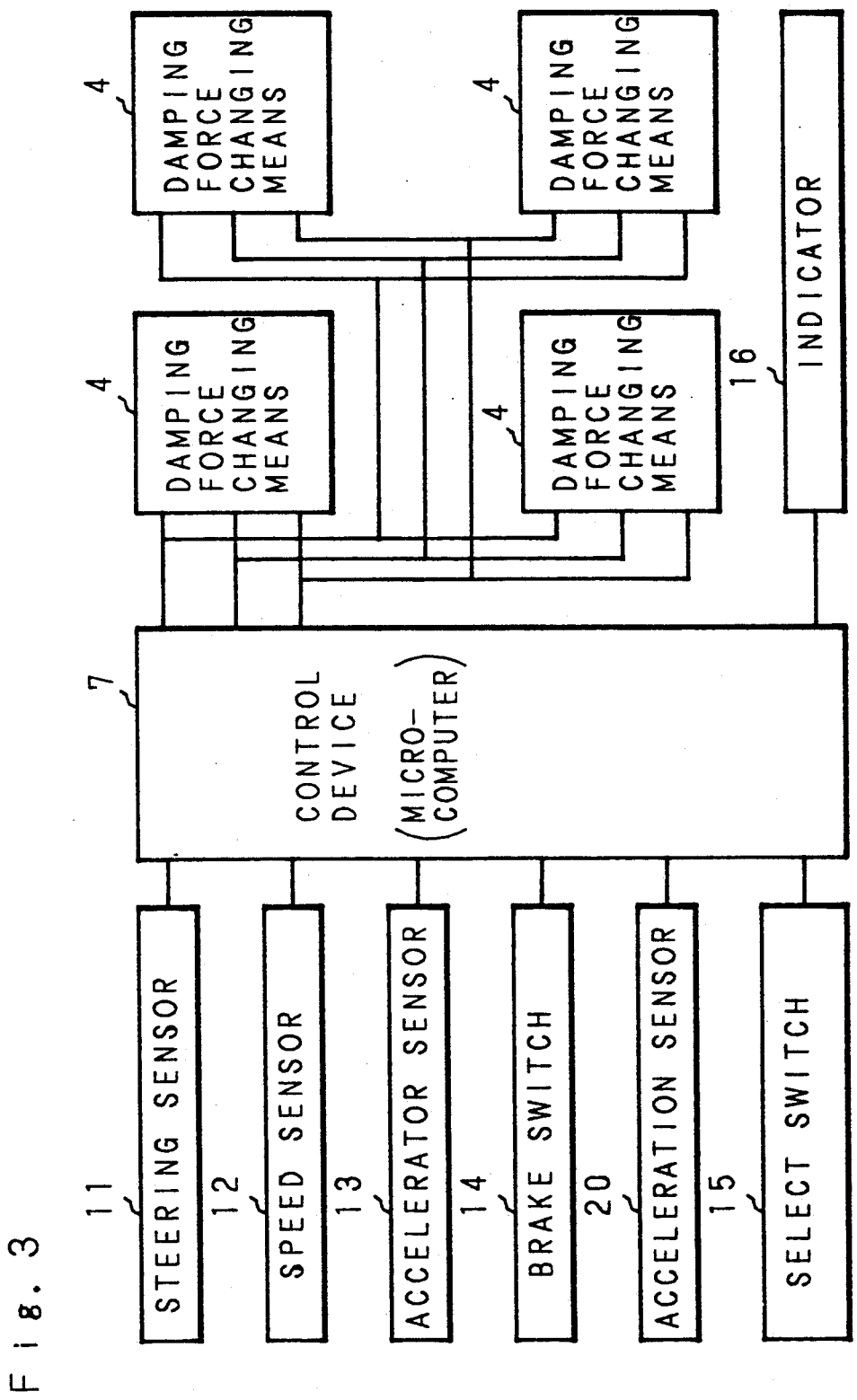
FIG. 3 is a block diagram showing a construction of each member shown in FIG. 2.

FIGS. 2 and 3 show an example of applying the control apparatus of the invention to change-over of damping force of the suspension, in which the control device 7 comprising a microcomputer is given outputs of a steering sensor 11 for detecting steering condition of a handle, a speed sensor 12 for detecting a vehicle speed, an acceleration sensor 13 for detecting operation of acceleration and deceleration for the vehicle body 1, a brake switch 14 for detecting the braking action, an acceleration sensor 20 as the acceleration detecting means, for detecting the vertical acceleration of the vehicle body 1, and a select switch 15 for setting a standard for deciding the characteristic of the damping force. The control device 7 controls four damping force change means 4 for changing over characteristics of four suspensions and an indicator 16 corresponding to the outputs from these sensors and switches.

The acceleration sensor 20 for detecting the vertical acceleration uses an acceleration pickup composed of, for example, a piezoelectric member, a sensor of a differential transformer type, or an acceleration sensor of a semiconductor strain gauge type for a car, and continuously outputs the vertical acceleration by analog voltage on the basis of the output level during the zero acceleration. The output of acceleration sensor 20 is digitally-converted and thereafter input to the control device 7 and its signal level and variation duration are obtained. In addition, in the FIG. 2 example, one acceleration sensor 20 is mounted at the center of gravity of the vehicle body 1, but its mounting position may be at the utmost end of vehicle body 1, or the number of sensor 20 may be two in the front and the rear, or one sensor may be provided at every suspension for each wheel.

Figure 4:
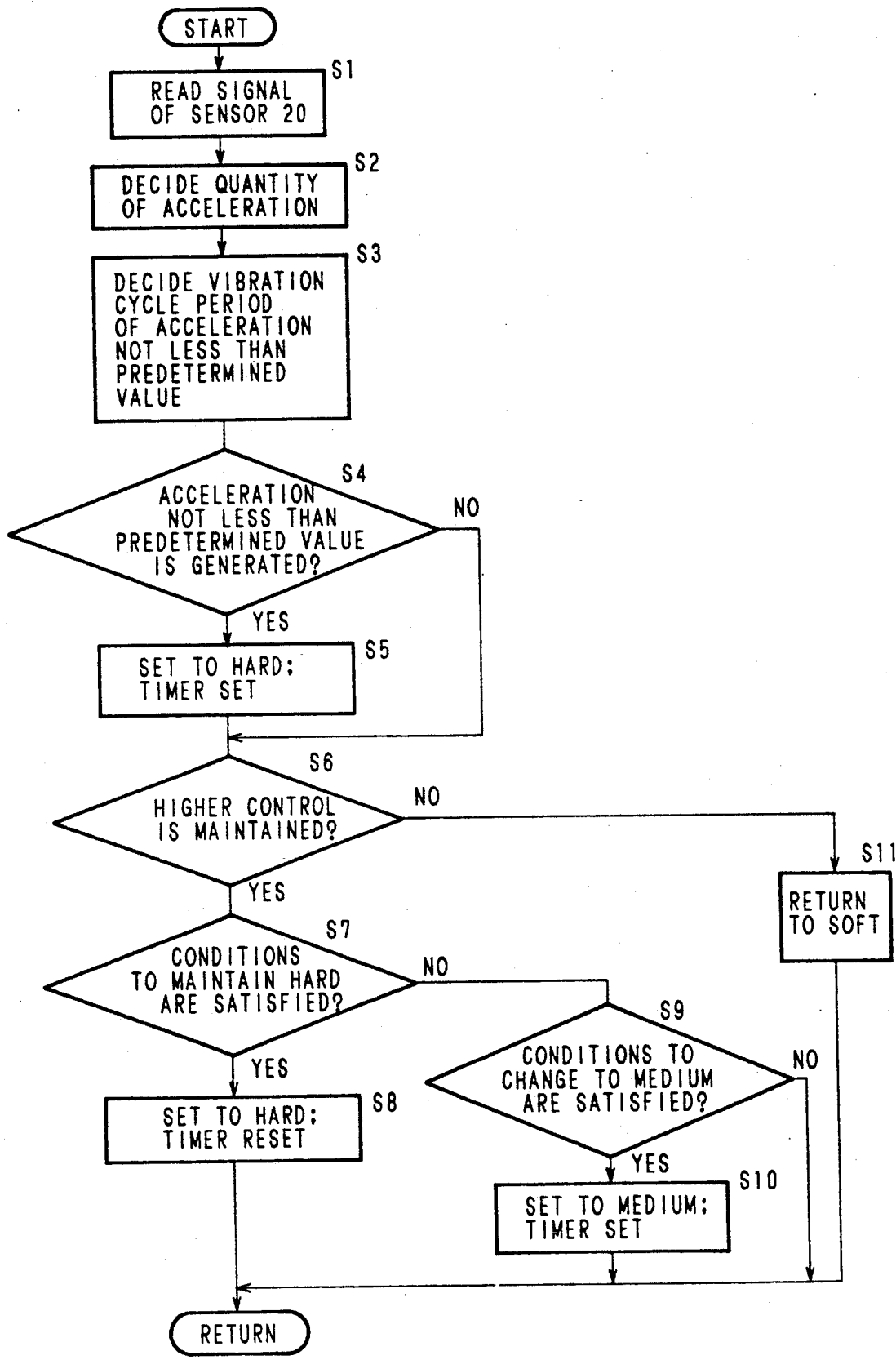
FIG. 4 is a flow chart showing a procedure of a first embodiment of the present invention.

Next, explanation will be given on the procedure of the control device 7 with reference to FIG. 4.

At first in Step S1, a signal of the acceleration sensor 20 is read, in Step S2, a quantity of vertical acceleration on the boundary of a desired reference point (±OG) is decided, and in Step S3, the vibration cycle period of acceleration not less than a first predetermined value is decided by one cycle period or half cycle period.

In Step S4, it is judged whether or not the acceleration not less than a second predetermined value is generated. When generated (YES in Step S4), the procedure advances to Step S5, in which the damping force of suspension is set to HARD and the timer for maintaining this state is set to a predetermined time to start counting, and if NO in Step S4, the procedure advances to Step S6.

In Step S6, it is judged whether or not the timer for maintaining a higher damping force is operating. If in operation (YES in Step S6), the procedure advances to Step S7. If not in operation (NO in Step S6), the procedure advances to Step S11 to thereby return the damping force to the basic SOFT.

In Step S7, it is judged whether or not measurement of vibration cycle period of acceleration ends and conditions to maintain the present state (HARD) are satisfied. If satisfied (YES in Step S7), that is, if the vibration frequency calculated by one cycle period or half cycle period of vibration of acceleration is not less than the first predetermined value and is near the above-spring resonance frequency of the vehicle body 1, in Step S8, the present state of HARD is maintained and a timer for maintaining HARD is reset to a predetermined time, thereby continuing counting. If not satisfied (NO in Step S7), the procedure advances to Step S9, so that it is judged whether or not measurement of vibration cycle period of acceleration ends and conditions to change HARD to MEDIUM are satisfied.

When conditions to change HARD to MEDIUM are satisfied (YES in Step S9), i.e., when quantity of acceleration is about medium though the vibration frequency is near the above-spring resonance frequency, or when the vibration frequency is near the below-spring resonance frequency of the vehicle body 1, in Step S10, the damping force is changed to MEDIUM a timer for maintaining MEDIUM is set (or reset). On the other hand, if NO in Step S9, the present state is not changed and the procedure returns.

In addition, in Step S4, it is judged whether or not the acceleration not less than the second predetermined value continues for the predetermined time or more, which is effective for removing a passing-away shock, such as noises.

In addition, in the above-mentioned example, the procedure on the basis of the vertical acceleration of the vehicle body 1 is described, but the damping force of the suspension on the basis of the lateral acceleration of vehicle body 1 is adjusted as the described above.

Second Embodiment

The present invention of the control apparatus of the invention is the same in construction as the first embodiment shown in FIGS. 1, 2 and 3. In the second embodiment, however, a differentiated value of acceleration and vibration cycle period of acceleration are decided on the basis of the information from the acceleration detecting means 2, so that a command signal is output, corresponding to the result of decision, to the damping force changing means 4, spring constant changing means 5 and torsion quantity changing means 6.

Figure 5:
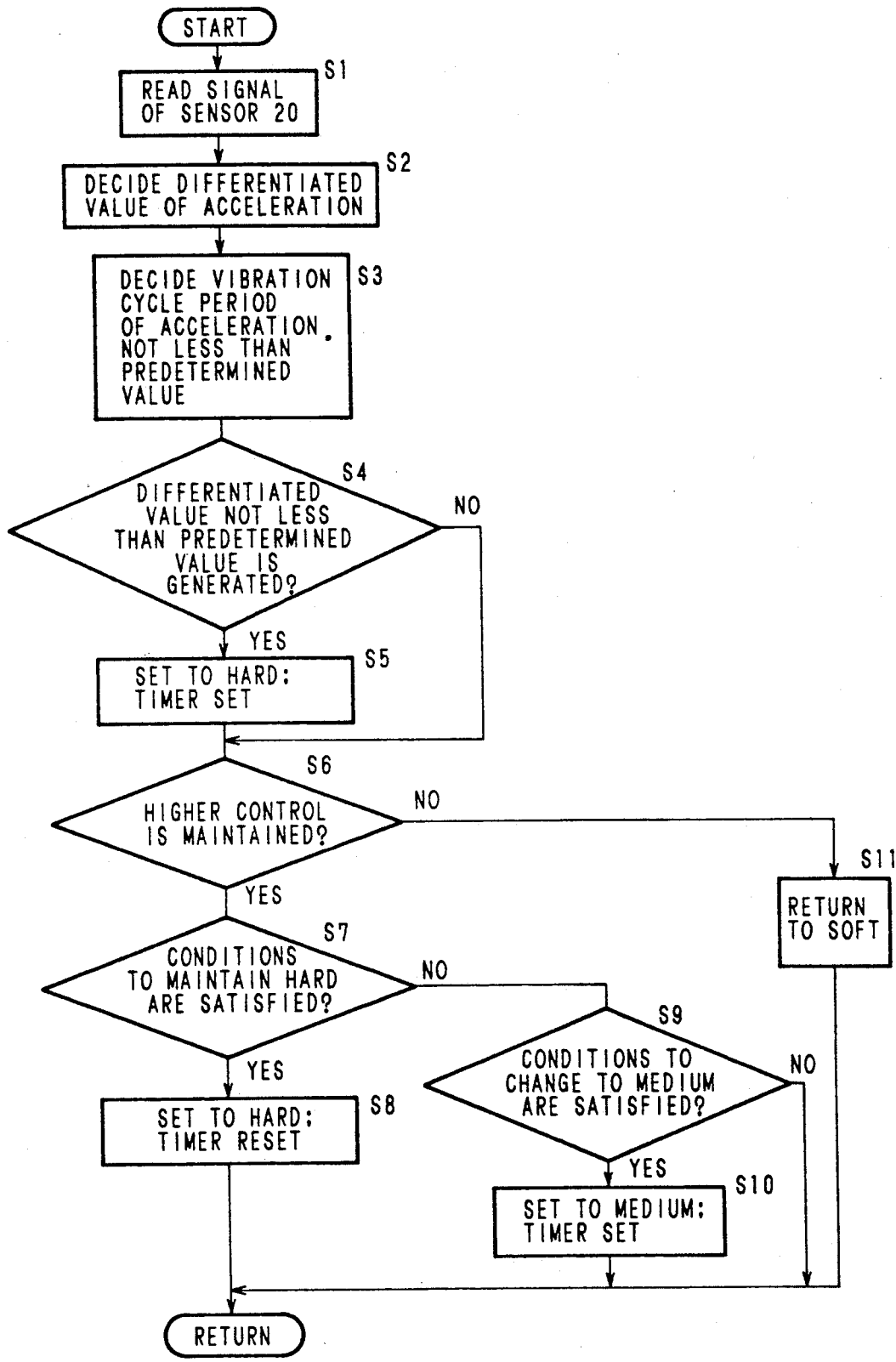
FIG. 5 is a flow chart showing a procedure of a second embodiment of the present invention.

Next, explanation will be given on the procedure of the control device 7 of the second embodiment with reference to FIG. 5.

At first, in Step S1, a signal of the acceleration sensor 20 is read, in Step S2, a differentiated value of vertical acceleration on the boundary of a desired reference point (±OG), in other words, a variation in the acceleration per unit time, is decided, and in Step S3, the vibration cycle period of acceleration not less than a first predetermined value is decided by one cycle period or half cycle period.

In Step S4, it is judged whether or not a differentiated value of acceleration not less than a second predetermined value is generated. If generated (YES in Step S4), the procedure advances to Step S5. In Step S5, the damping force of the suspension is set to HARD and the timer for maintaining this state is set to a predetermined time to start counting. If NO in Step S4, the procedure advances to Step S6.

In Step S6, it is judged whether or not the timer for maintaining a higher damping force is operating. If operating (YES in Step S6), the procedure advances to Step S7. If not operating (NO in Step S6), the procedure advances to Step S11 to thereby return the damping force to the basis SOFT.

In Step S7, it is judged whether or not measurement of the vibration cycle period of acceleration ends and conditions to maintain the present state (HARD) are satisfied. If satisfied (YES in Step S7), i.e., where the vibration frequency calculated by one cycle period of half cycle period of vibration of acceleration not less than the first predetermined value is near the above-spring resonance frequency of vehicle body 1, in Step S8, the present state of HARD is maintained and a timer for maintaining HARD is reset to a predetermined time to continue counting. If not satisfied (NO in Step S7), the procedure advances to Step S9 so as to judge whether or not measurement of vibration cycle period of acceleration ends and conditions to change HARD to MEDIUM are satisfied.

When conditions to change HARD to MEDIUM are satisfied (YES in Step S9), i.e., when quantity of acceleration is about medium though the vibration frequency is near the above-spring resonance frequency, or when the vibration frequency is near the below-spring resonance frequency of the vehicle body 1, in Step S10, the damping force is changed to MEDIUM and a timer for maintaining MEDIUM is set (or reset). On the other hand, if NO in Step S9, the present state is not changed and the procedure returns.

In addition, when it is intended to be judged in Step S4 whether or not the differentiated value of acceleration is not less than the second predetermined value and the acceleration is not less than a predetermined value, it is effective for removing a passing-away shock, such as noises.

In addition, the aforesaid embodiment is described of its procedure on the basis of vertical acceleration of vehicle body 1, but the damping force of suspension can be adjusted on the basis of lateral acceleration of vehicle body 1 in the same manner as described above relating to the first embodiment.

In the above-mentioned first and second embodiments, the examples of controlling the damping force of suspension are described, but the spring constant of suspension and torsion quantity of stabilizer are quite similarly controllable. All of them may of course be simultaneously controlled.

Also, the characteristic is changed over into 3 steps of SOFT, MEDIUM and HARD, but not limited thereto. The present invention is applicable to a case where the characteristic is changed-over into two or four steps or more.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes bounds of the claims, or equivalents of such meets and bounds thereof are therefore intended to be embraced by the claims.

What is claimed is:

1. A control apparatus of a support unit for supporting a vehicle body which controls a characteristic of said support unit, said control apparatus comprising:
   detecting means for detecting acceleration of said vehicle body;
   change-over means for changing over the characteristic of said support unit into a plurality of states; and
   control means for controlling said change-over means on the basis of a quantity and a vibration cycle period of the acceleration detected by said detecting means, wherein said support unit is a suspension and a stabilizer, said characteristic includes at least one of a damping force and a spring constant of said suspension, and a torsion quantity of said stabilizer, and
   when said quantity and said vibration cycle period of said acceleration detected by said detecting means is no less than a predetermined value, said control means controls said change-over means such that the characteristic of said support unit is set to a first state, said characteristic being maintained at said first state in accordance with to a length of said vibration period.

2. A control apparatus of a support unit according to claim 1, wherein said control means decides whether the characteristic of said support unit is maintained in said first state or changed to a second state according to the length of said vibration cycle period.

3. A control apparatus of a support unit according to claim 1, wherein said detecting means detects vertical acceleration of said vehicle body.

4. A control apparatus of a support unit according to claim 1, wherein said detecting means detects lateral acceleration of said vehicle body.

5. A control apparatus of a support unit for supporting a vehicle body which controls a characteristic of said support unit, said control apparatus comprising:
   detecting means for detecting acceleration of said vehicle body;
   change-over means for changing over the characteristic of said support unit into a plurality of states; and
   control means for controlling said change-over means on the basis of a differentiated value and a vibration cycle period of the acceleration detected by said detecting means, wherein said support unit is a suspension and a stabilizer, said characteristic is at least one of a damping force and a spring constant of said suspension, and a torsion quantity of said stabilizer, and when said differentiated value and said vibration cycle period of said acceleration detected is no less than a predetermined value, said control means controls said change-over means such that the characteristic of said support unit is set to a first state, said characteristic being maintained at said first state in accordance with to a length of said vibration period.

6. A control apparatus of a support unit according to claim 5, wherein said control means decides whether the characteristic of said support unit is maintained in said first state or changed to a second state according to the length of said vibration cycle period.

7. A control apparatus of a support unit according to claim 5, wherein said detecting means detects vertical acceleration of said vehicle body.

8. A control apparatus of a support unit according to claim 5, wherein said detecting means detects lateral acceleration of said vertical body.

* * * * *